United States Patent [19]
Grigull

[11] 3,969,314
[45] July 13, 1976

[54] PRODUCTION OF PLASTIC-FILLER MIXTURES

[75] Inventor: Hans Grigull, Cologne, Germany

[73] Assignee: Leybold-Heraeus GmbH & Co. KG, Cologne-Bayental, Germany

[22] Filed: July 3, 1974

[21] Appl. No.: 485,515

[30] Foreign Application Priority Data
July 5, 1973 Germany............................ 2334189

[52] U.S. Cl................................. 260/42; 106/309; 259/8; 259/66; 260/37 R; 260/37 PC; 260/40 R
[51] Int. Cl.².......................................... C08K 9/00
[58] Field of Search............... 260/40 R, 37 PC, 42; 106/309; 259/8, 66

[56] References Cited
FOREIGN PATENTS OR APPLICATIONS
866,326   4/1961   United Kingdom................ 106/309

Primary Examiner—James H. Derrington
Attorney, Agent, or Firm—Spencer & Kaye

[57] ABSTRACT

In the formation of mixtures of plastic and fillers, the stability of the mixture is improved by preliminarily intensively predrying the fillers and then mixing the plastic and fillers together while maintaining the mixture completely free of moisture.

10 Claims, 2 Drawing Figures

U.S. Patent   July 13, 1976   3,969,314 the present invention

PRODUCTION OF PLASTIC-FILLER MIXTURES

BACKGROUND OF THE INVENTION

The present invention relates to a method and apparatus for producing mixtures of a plastic and filler.

The admixture of fillers, for example quartz meal, glass fiber, powdered glass, talcum, whiskers or the like with plastics is known. Fillers are used to improve stability, to make the raw material less expensive and to achieve high heat resistance. Prerequisites for the fillers are that they initially be well distributed throughout the mixture and not become demixed during further processing due primarily to the often great differences in specific weight. This problem of embedding fillers into plastic without incurring later demixing has not been solved as yet in a satisfactory manner. It has therefore not heretofore been possible to process plastic and filler mixtures with filler contents worth mentioning in the manufacture of blown hollow bodies.

SUMMARY OF THE INVENTION

It is therefore an object of the present invention to produce a plastic and filler mixture in which the described drawbacks are eliminated, and in particular subsequent demixing will not occur.

These and other objects are accomplished according to the present invention by initially subjecting the fillers to intensive predrying and thereafter carrying out the actual mixing process in an environment maintained free of moisture.

Surprisingly, it has been found that this predrying of the fillers has a decisive effect on promoting the stability of the mixture.

Advisably, the predrying of the fillers is effected by subjecting them to an increased temperature and a vacuum. Thus the fillers are predried particularly intensively.

It is further advantageous for the mixing process also to take place at an increased temperature and under a vacuum. Thus the exclusion of moisture is assured during the actual mixing process.

The predrying of the fillers and the actual mixing process may be effected in a single heatable and coolable vacuum vessel including a mixing device. The amount of apparatus required for practicing the method of the present invention can thus be kept small.

Advisably the temperature of the mixture is controlled during the mixing process so that the surface of the plastic particles, which are preferably present in powder form, will gel. Thus the filler particles will be deposited on the surfaces of the plastic particles so that the plastic particles and filler particles will form agglomerations and which will not be subsequently demixed.

Plastic and filler mixtures produced according to the present invention are advisably introduced under vacuum into the machine intended for further processing, for example an extruder. This also results in an improvement in the end product with respect to homogeneity, prevention of the inclusion of air and the like.

A desirable apparatus for performing the method of the invention includes a heatable and coolable vacuum vessel and a mixing device. In this vessel the fillers can be predried and the actual mixing process can take place as well.

DESCRIPTION OF THE PREFERRED EMBODIMENTS

Figure 1:
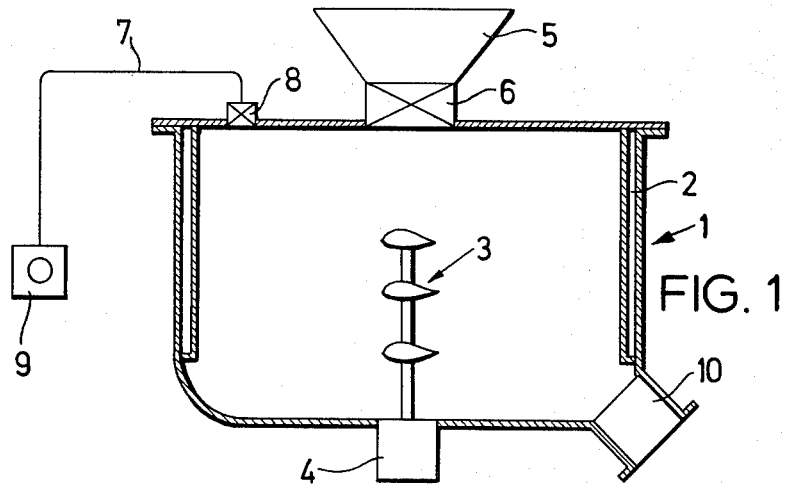
FIGS. 1 and 2 are elevational, cross-sectional views of two preferred embodiments for carrying the present invention.

FIG. 1 illustrates a vacuum vessel 1 in which the predrying of the fillers and the mixing process take place. The walls of vessel 1 are double walls which form an annular chamber 2 through which flows a heating or cooling agent, such as oil or the like. Within vessel 1 is disposed a mixing device 3 which is caused to rotate by a drive assembly 4. The mixing device may be, for example, an impact mixer, or impact reactor. In such a mixer the mixing vanes have approximately the cross-sectional configuration of airplane wings.

The vacuum vessel 1 is supplied with filler plastic through a fill device 5 and a slide valve 6. The interior of vessel 1 is in communication with a vacuum pump 9 via a line 7 and valve 8.

From vacuum vessel 1, the plastic and filler mixture produced therein can be transported directly through connecting stud 10 into the machine in which the mixture is to be further processed.

Figure 2:
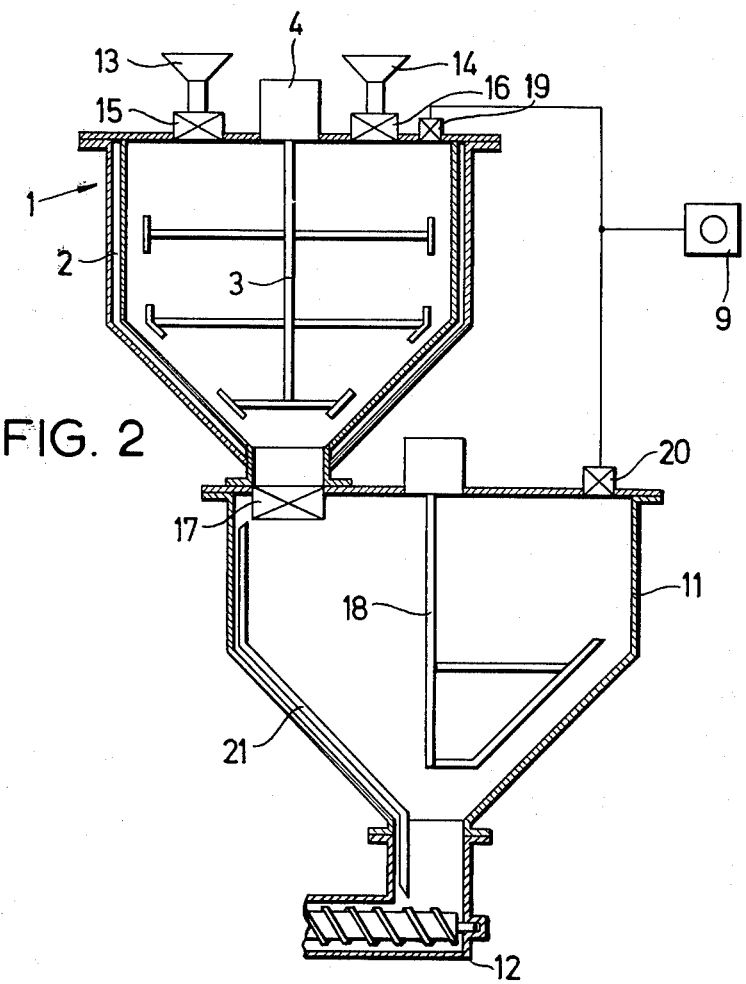

In the embodiment shown in FIG. 2, a further, funnel-shaped vacuum vessel 11 may be provided so that the further processing machine, e.g. an extruder 12 which is shown only in part, can be supplied continuously. Vessel 1' corresponds to vessel 1 but in this embodiment has a funnel shape and is provided with a mixing device 3' having transverse arms carrying end pieces formed to correspond to the inner surface of vessel 1'. Separate filling devices 13 and 14 with vacuum-tight slide valves 15 and 16, respectively, are provided to fill vessel 1 with plastic and filler, respectively. In order to separate vessel 1' from vessel 11 in an airtight manner, a slide valve 17 is provided therebetween. Furthermore, a stirring mechanism 18 is accommodated in funnel 11. Vacuum pump 9 serves to produce the required vacuum in vessels 1' and 11. Pump 9 is connected to these vessels via valves 19 and 20, respectively.

The funnel-shaped vessel 11 may be designed in the manner disclosed in German Pat. No. 1,454,834. For this purpose a degassing pipe 21 is provided within vessel 11 so that the vacuum is maintained also in the region of the opening toward extruder 12.

According to exemplary embodiments of the method of the present invention, carried out in the apparatus as illustrated in FIGS. 1 and 2, the filler is initially predried in vessel 1 or 1' at a temperature of about 200°C and a pressure of about 1 Torr. These values apply particularly when the filler is talcum or chalk. Then powdered plastic is introduced into vessel 1 or 1', the quantity of plastic relative to the quantity of filler depending on the desired filler/plastic mixing ratio, which may lie between 10:90 and 50:50. For chalk and talcum, mixing ratios of 30:70 or 40:60 have been found to be particularly advisable. If the plastic and filler mixture is to be tinted, or colored, then it is further advisable to introduce the color pigments into vessel 1 before the actual mixing process. The mixing process then simultaneously effects uniform coloring of the mixture.

The plastic and filler mixture moves from vessel 1', for example, to the vacuum funnel 11 of FIG. 2, which continuously supplies extruder 12. The mixture thus enters extruder 12 in a completely degassed state, which particularly contributes to the good quality of the end product. Maintenance of a vacuum in funnel 11 is not absolutely necessary since the plastic has already been substantially degassed during the mixing process. In some special cases, however, it may be advisable to provide a vacuum or a protective gas atmosphere, for example of nitrogen or $CO_2$, in funnel 11.

Plastic and filler mixtures produced according to the method of the present invention are particularly suited for the production of blown hollow bodies which serve predominantly as containers for liquids or powders, such as detergents. The subsequent destruction of such hollow bodies is simpler and particularly more favorable to the environment since, for example, when chalk is used as the filler, combustion of containers made of such a plastic and filler mixture takes a more favorable course. Finally, the mixture is also about 25% less expensive than pure plastic.

The plastic could be constituted by any one of a number of suitable thermoplastic resins such as, for example, polyvinyl chloride resin. The mixing operation could be carried out, for example, at a temperature of 100°C and a pressure of 1 Torr.

Polycarbonate, polyester, polyethylene, polyolefin, polypropylene and others can be employed in mixtures formed according to the invention, as can any thermoplastic and duro-plastic materials in powder form.

The particular temperature, pressure and processing time employed for the predrying and the mixing depend on the moisture content, and the particle size and softening point of the plastic.

EXAMPLE 1

100 kg of chalk was predried to a moisture content of 50 ppm at a temperature of 210°C. After cooling to 50°C, the chalk was mixed with 200 kg of polyethylene at a temperature of 60° to 65°C and a pressure of about 1 Torr for 6 – 8 minutes.

EXAMPLE 2

100 kg of talcum was predried to a moisture content of 50 ppm at a temperature of 210°C. After cooling to 80°C, the talcum was mixed with 200 kg of polypropylene at a temperature of 165°C and a pressure of about 1 Torr for 6 – 8 minutes.

It will be understood that the above description of the present invention is susceptible to various modifications, changes and adaptations, and the same are intended to be comprehended within the meaning and range of equivalents of the appended claims.

I claim:

1. In a method for mixing a plastic and fillers together to produce a mixture thereof, the improvement comprising initially subjecting the fillers, prior to mixing, to intensive predrying by creating an increased temperature and maintaining the fillers under a vacuum and then maintaining the plastic and fillers free of moisture during the actual mixing process by performing the mixing process at an increased temperature and under vacuum.

2. Method as defined in claim 1 wherein said predrying of the fillers and the actual mixing process are effected in a single heatable and coolable vacuum vessel containing a mixing device for mixing the plastic and filler together.

3. Method as defined in claim 1 wherein the plastic is introduced in the form of particles and further comprising maintaining the temperature of the mixture, during the mixing process, such that the surfaces of the plastic particles become gelled.

4. Method as defined in claim 3 wherein the plastic is in powder form.

5. Method as defined in claim 1 wherein the predrying is effected at about 200°C and the mixing process is carried out at about 100°C at a pressure of about 1 Torr.

6. Method as defined in claim 1 wherein the ratio of filler to plastic in the mixture is between 10:90 and 50:50.

7. Method as defined in claim 1 wherein the filler is chalk or talcum, the plastic is polyvinyl chloride resin, and the ratio of filler to plastic is about 40:60.

8. Method as defined in claim 1 further comprising introducing pigments to color the mixture before the mixing process.

9. Method as defined in claim 1 comprising the subsequent step of introducing the resulting mixture under vacuum into a machine in which the mixture is processed further.

10. Method as defined in claim 1 wherein said step of introducing comprises maintaining the mixture in a protective gas atmosphere.

* * * * *